US008001164B2

(12) United States Patent
Kim

(10) Patent No.: US 8,001,164 B2
(45) Date of Patent: Aug. 16, 2011

(54) METHOD FOR PROVIDING FILE INFORMATION IN PORTABLE DEVICE

(75) Inventor: Hong Kyo Kim, Gumi-si (KR)

(73) Assignee: LG Electronics Inc., Seoul (KR)

( * ) Notice: Subject to any disclaimer, the term of this patent is extended or adjusted under 35 U.S.C. 154(b) by 344 days.

(21) Appl. No.: 11/435,737

(22) Filed: May 18, 2006

(65) Prior Publication Data

US 2006/0277204 A1 Dec. 7, 2006

(30) Foreign Application Priority Data

May 19, 2005 (KR) ........................ 10-2005-0041873

(51) Int. Cl.
*G06F 12/00* (2006.01)
*G06F 17/30* (2006.01)
(52) U.S. Cl. ......... 707/821; 707/828; 707/829; 710/120
(58) Field of Classification Search .................. None
See application file for complete search history.

(56) References Cited

U.S. PATENT DOCUMENTS

| 6,760,721 | B1 * | 7/2004 | Chasen et al. ..................... 707/3 |
| 6,799,226 | B1 * | 9/2004 | Robbin et al. .................. 710/15 |
| 6,928,433 | B2 * | 8/2005 | Goodman et al. ................ 707/4 |
| 7,043,477 | B2 * | 5/2006 | Mercer et al. ..................... 707/7 |
| 7,254,837 | B2 * | 8/2007 | Fields ............................. 726/27 |
| 7,373,110 | B1 * | 5/2008 | McClain ...................... 455/41.2 |
| 2002/0002039 | A1 * | 1/2002 | Qureshey et al. ............ 455/344 |
| 2002/0032833 | A1 * | 3/2002 | Kobayashi et al. ........... 711/112 |
| 2002/0046315 | A1 * | 4/2002 | Miller et al. ....................... 711/1 |
| 2002/0048224 | A1 * | 4/2002 | Dygert et al. ..................... 369/1 |
| 2002/0091709 | A1 * | 7/2002 | Jung ........................... 707/104.1 |
| 2002/0093884 | A1 * | 7/2002 | Hochendoner ............ 369/30.05 |
| 2002/0118952 | A1 * | 8/2002 | Nakajima et al. ............... 386/69 |
| 2002/0140720 | A1 | 10/2002 | Uno et al. ...................... 345/716 |
| 2002/0147728 | A1 * | 10/2002 | Goodman et al. ......... 707/104.1 |
| 2003/0020671 | A1 * | 1/2003 | Santoro et al. ................. 345/1.3 |
| 2003/0095096 | A1 * | 5/2003 | Robbin et al. ................ 345/156 |
| 2003/0135513 | A1 * | 7/2003 | Quinn et al. .................. 707/102 |
| 2003/0158737 | A1 * | 8/2003 | Csicsatka ...................... 704/273 |
| 2003/0182315 | A1 * | 9/2003 | Plastina et al. ................ 707/200 |
| 2003/0208767 | A1 * | 11/2003 | Williamson et al. ............ 725/93 |
| 2004/0047304 | A1 * | 3/2004 | Takahashi et al. ............ 370/310 |
| 2004/0055446 | A1 * | 3/2004 | Robbin et al. .................. 84/615 |
| 2004/0075698 | A1 * | 4/2004 | Gao et al. ...................... 345/854 |

(Continued)

FOREIGN PATENT DOCUMENTS

EP 1 160 658 A2 12/2001

OTHER PUBLICATIONS

Apple, Inc.; "iPod User's Guide" (XP-002398567); retrieved Sep. 12, 2006; <URL: http://manuals.info.apple.com/_en/iPod_Click_Wheel_UserGuide.pdf>.

(Continued)

*Primary Examiner* — Mohammad Ali
*Assistant Examiner* — Angelica Ruiz
(74) *Attorney, Agent, or Firm* — KED & Associates LLP

(57) ABSTRACT

The methods and apparatuses of the present invention for efficiently providing file information in a portable device with limited screen size. When a plurality of files contain substantially identical file information, the present invention utilizes the file information that is different to distinguish from other files.

15 Claims, 8 Drawing Sheets

U.S. PATENT DOCUMENTS

| | | | |
|---|---|---|---|
| 2004/0078357 A1* | 4/2004 | LaChapelle et al. | 707/2 |
| 2004/0078382 A1* | 4/2004 | Mercer et al. | 707/102 |
| 2004/0078383 A1* | 4/2004 | Mercer et al. | 707/102 |
| 2004/0170386 A1* | 9/2004 | Mikawa | 386/69 |
| 2004/0177319 A1* | 9/2004 | Horn | 715/501.1 |
| 2004/0184310 A1* | 9/2004 | Seo et al. | 365/154 |
| 2004/0202059 A1* | 10/2004 | McComas | 369/30.07 |
| 2004/0225519 A1 | 11/2004 | Martin | 705/1 |
| 2004/0243482 A1* | 12/2004 | Laut | 705/27 |
| 2004/0252604 A1* | 12/2004 | Johnson et al. | 369/47.22 |
| 2005/0055375 A1* | 3/2005 | Torii et al. | 707/104.1 |
| 2005/0083794 A1* | 4/2005 | Tagawa et al. | 369/30.08 |
| 2005/0146995 A1* | 7/2005 | Morita | 369/30.09 |
| 2005/0172786 A1* | 8/2005 | Plastina et al. | 84/600 |
| 2005/0174889 A1* | 8/2005 | Marcantonio et al. | 368/12 |
| 2005/0175313 A1* | 8/2005 | Takakuwa et al. | 386/1 |
| 2005/0187976 A1* | 8/2005 | Goodman et al. | 707/104.1 |
| 2005/0195696 A1* | 9/2005 | Rekimoto | 369/30.08 |
| 2005/0198075 A1* | 9/2005 | Plastina et al. | 707/104.1 |
| 2005/0198678 A1* | 9/2005 | Mise et al. | 725/88 |
| 2005/0213944 A1* | 9/2005 | Yoo et al. | 386/96 |
| 2005/0259957 A1* | 11/2005 | Jung et al. | 386/65 |
| 2005/0259976 A1* | 11/2005 | Shimoda et al. | 386/125 |
| 2005/0283734 A1* | 12/2005 | Santoro et al. | 715/765 |
| 2006/0095848 A1* | 5/2006 | Naik | 715/716 |
| 2006/0123058 A1* | 6/2006 | Mercer et al. | 707/104.1 |
| 2006/0209652 A1* | 9/2006 | Toms et al. | 369/47.55 |
| 2006/0277226 A1* | 12/2006 | Chikusa et al. | 707/201 |
| 2008/0010372 A1* | 1/2008 | Khedouri et al. | 709/224 |

OTHER PUBLICATIONS

European Search Report dated Sep. 25, 2006.

\* cited by examiner

File_Info.

| Sign | Length (Bytes) | Position (Bytes) | Description |
|---|---|---|---|
| A | 3 | (0-2) | Tag Identification Must contain 'TAG' if tag exists and is correct |
| B | 30 | (3-32) | Title |
| C | 30 | (33-62) | Artist |
| D | 30 | (63-92) | Album |
| E | 4 | (93-96) | Year |
| F | 30 | (97-126) | Comment |
| G | 1 | (127) | Genre |

Display mode 1

Display mode 2

Problem

Solution

Problem in
Display mode 1

No Problem in
Display mode 2

Solution

No Problem in Display mode 1

Problem in Display mode 2

Solution

US 8,001,164 B2

METHOD FOR PROVIDING FILE INFORMATION IN PORTABLE DEVICE

BACKGROUND OF THE INVENTION

1. Field of the Invention

The present invention relates to a method for providing file information stored in a portable device, and more particularly, to a method for providing file information for a selected file for a portable player.

2. Description of the Related Art

A portable device such as an MP3 player is able to play audio files, but is also able to display file information about the audio files on a display. Such players operate by searching for various tags recorded in files, such as in MP3 audio files, to read necessary data, provide file information (song information) of a corresponding file from the read data to an LCD, etc., and restore data compressed and recorded in a frame of each of the MP3 audio files to high quality audio data using information recorded in a header of each of the MP3 audio files, regarding the corresponding file, thereby playing high quality audio.

Meanwhile, since players, such as portable MP3 players, aim at being reduced in size such that users can easily carry them, the LCD size is generally small. Therefore, only portions of the file information of files stored in the players are provided at a time to the LCD whose display size is limited, which is inconvenient to users who must select a desired audio file and play it using limited file information.

For example, when a file selected in the play list displayed through the current screen has file information which is partially identical to that of the preceding or the following file, for example, when the file has the same artist name and the same album name, the entire file information scrolls and is displayed from the top to the end. Thus the such a method has disadvantages in that, it takes a relatively long time for a user to search for the corresponding file, and playback operations are delayed. Also, when all information of a file scrolls to be displayed in order, a back light may turn off during the display, because a predetermined back light duration time elapses. In this case, as the information displayed on the LCD cannot be identified, a key button must be pressed again to turn on the back light.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

An object of the present invention is to rapidly locate and play a desired file.

It is another object of the present invention to provide a method for effectively displaying file information when a display has limited size.

In accordance with the present invention, the above and other objects can be accomplished by the provision of a method for providing file information in a portable player, comprising comparing a selected one of N files with the file preceding the selected file and/or the file following the selected file with respect to file information, wherein file information of the N files is provided through a screen of the portable player, respectively; and if it is determined based on the comparison that the selected file is identical to the preceding file and/or the following file with respect to predetermined elements of the file information, providing the file information, except for the identical elements, of the selected file on the screen.

The file includes at least one of an MP3 audio file, a WMA audio file, an Ogg audio file, or an MPC audio file. If the file is an MP3 audio file, the file information is read from an ID3 tag of a corresponding file to be compared therewith.

The predetermined elements of the file information include an artist name and an album name. The file information, except for the identical elements, of the selected file, which is provided on the screen, includes a song name.

The file information of the selected file is displayed in a highlighted or shaded fashion. The method may further comprise providing a symbol, wherein the symbol indicates that to which of the preceding file or the following file the selected file is identical with respect to the predetermined elements of the file information. In addition to or alternatively, the file information except for the identical elements is displayed in a scroll fashion, if the file information except for the identical elements is larger than the size of the screen.

The method may further comprise when the identical elements to be displayed are larger than the screen size, displaying the identical elements in a scroll fashion, regarding one of the preceding file or the following file information of which includes the identical elements. The symbol does not scroll.

The method may further comprise providing all elements of the file information of a played file in a scroll fashion, if the selected file is played.

The method may further comprise: in a state where a first file, which is an (N−1)-th file of N files displayed on the screen, has been selected, the first file and a second file, which is an N-th file displayed on the screen, are not identical to each other with respect to the predetermined elements, and a third file, which is to be aligned next to the second file, and the second file are identical to each other with respect to the predetermined elements, in which the third file is one of files stored in the player, when the second file is selected; newly displaying N−1 files from a file secondly displayed on the screen to the second file N-thly displayed, and the third file on the screen; displaying the file information, except for the identical elements, of the second file, which is (N−1)-thly displayed on the newly displayed screen, in a highlighted or shaded fashion; and displaying a symbol indicating that the second file is identical to the third file N-thly displayed on the newly displayed screen with respect to the predetermined elements.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figures 1, 2:
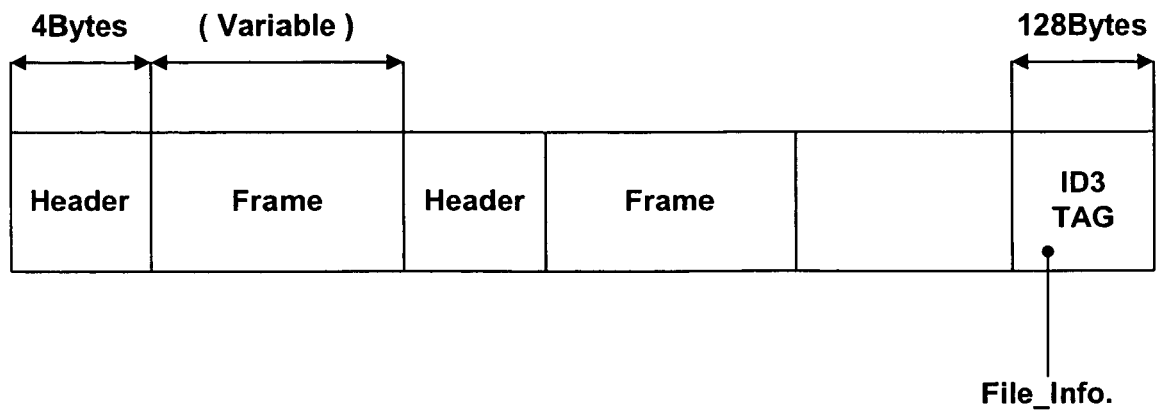
FIG. 1 is a view illustrating a recording format of an MP3 audio file.
FIG. 2 is a view illustrating a recording format of a tag of the MP3 audio file shown in FIG. 1.

FIG. 1 is a view illustrating an exemplary recording format of an MP3 audio file. The MP3 audio file includes a header having a fixed length of 4 bytes, at least one or more frames having variable lengths, and an ID3 tag of 128 bytes, in which file information File_Info for the MP3 audio file is recorded.

FIG. 2 is a view illustrating an exemplary recording format of the tag of the MP3 audio file shown in FIG. 1. The file information contains various information, and the recording format of the tag is configured such that the tag records a TAG for identification as a tag in the first 3 bytes thereof, and then, sequentially, a song tide of 30 bytes, artist of 30 bytes, album of 30 bytes, year of 4 bytes, comments of 30 bytes, and genre of 1 byte. As such, the tag records file information (e.g., song information) of various elements or information of an MP3 audio file.

Figure 3:
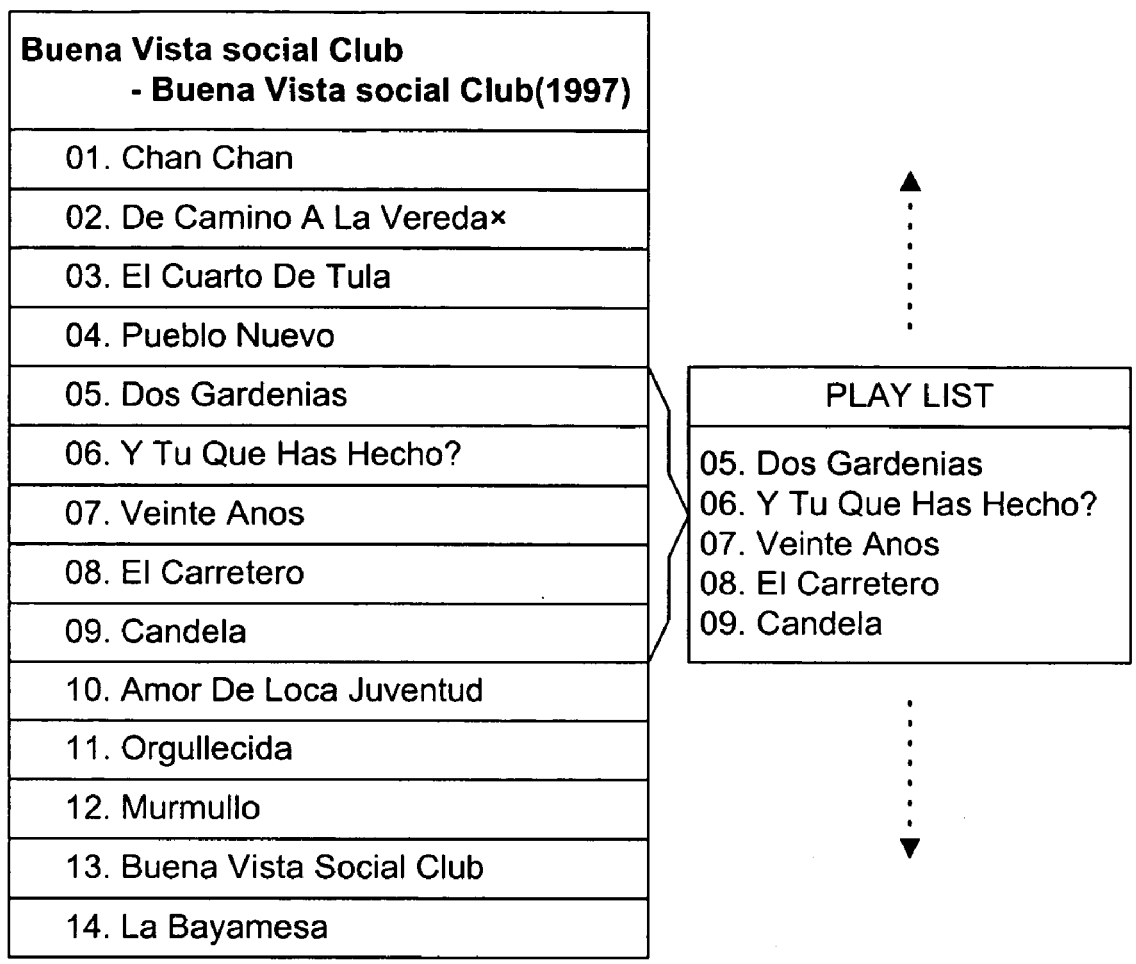
FIG. 3 is a table including a plurality of MP3 audio files in the same album of the same artist stored in a memory, and a play list displayed on an LCD.

FIG. 3 is a table including a plurality of MP3 audio files from the same album of the same artist stored in a memory, but a play list includes a predetermined number of files displayed on a display (e.g., LCD, electroluminescent panel, etc.). The player does not display all of the file information for each file in the play list at once, but instead displays only a fraction of the file information. Generally, since the player provides file information starting with artist's names for each file, album name, year, comment, song name, etc., in order, the LCD provides the file information as large as it can display. Optionally, the player may display all file information for a selected file in a highlighted or shaded fashion through the LCD display, in order, which can be shown by a scroll operation, such that users can identify file information of the selected file. The provision of the file information to the LCD display will be described in detail with reference to FIG. 4.

Figure 4:
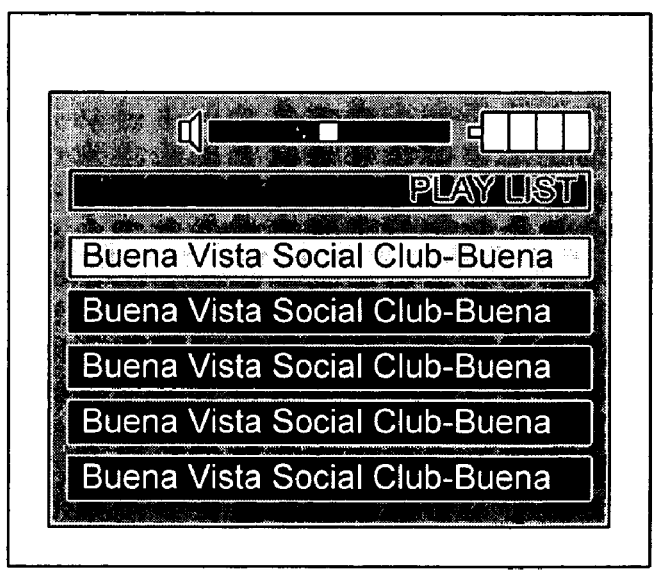
FIG. 4 is a screen displaying a play list according to a file information providing method.

FIG. 4 is a screen displaying a play list in its entirety according to a file information providing method. When songs included in the same album of the same artist, for example, the album 'Buena Vista Social club' by the Buena Vista Social Club (artist's name), are stored in the player, users cannot identify specific songs because file information of a song (file) initially displayed is the same as that of other songs included in the play list, like 'Buena Vista social club-Buena Vista Social club 1997.' Therefore, the users can distinguish and select a particular song in the play list if the user uses the direction key button of the player to select a song such that all file information for the selected song can be shown in order by a scroll operation. After reading the entire scrolled file information, users can then identify whether the currently selected song is the song they desired.

For example, when a user selects the first song in a play list as shown in FIG. 4, or when the first song name is highlighted as the cursor is positioned at the first song, all file information for the song, like "Buena Vista Social Club Buena Vista Social Club 1997 05. Dos Gardenias.mp3", scrolls and is displayed in order. The song may be selected and played afterwards. However scrolling through the entire file information of the song is time consuming.

Figure 5:
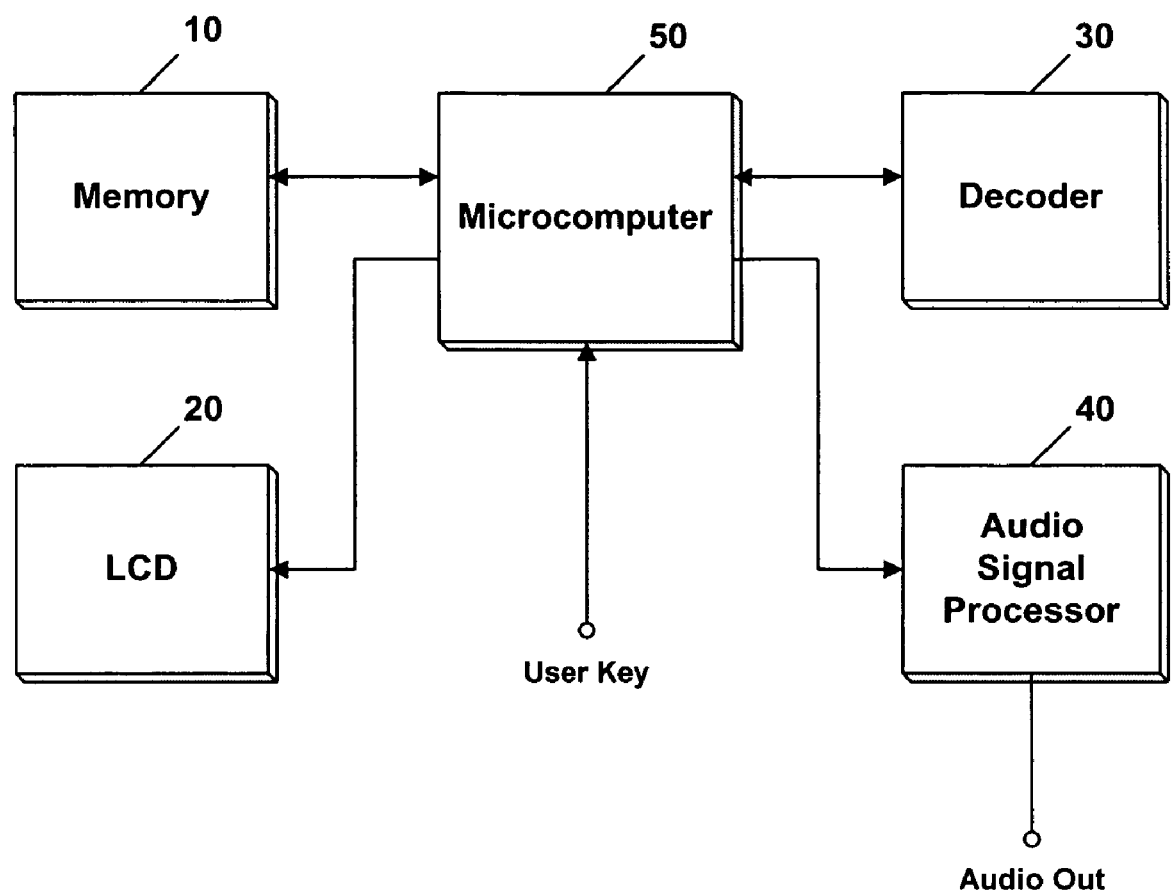
FIG. 5 is a schematic block diagram of a portable player adopting a file information providing method according to an embodiment of the present invention.

FIG. 5 is a schematic block diagram of a portable player, for example, an MP3 player. The MP3 player includes a memory 10 for storing a plurality of MP3 audio files, an LCD 20 for displaying a current play list, at least one file information (song information), a current operation state of a device, etc., a decoder 30 for decoding compressed audio data into uncompressed audio data, an audio signal processor 40 for processing the decoded audio data to play audio signals, and a microcomputer 50 for controlling a displaying operation and a playing operation.

In various exemplary embodiments, the memory 10 may be implemented with an imbedded flash ROM, a hard disk, or a separable memory card. The memory 10 stores audio files, such as an MP3 audio file, a WMA audio file, an Ogg audio file or an MPC audio file, and/or any storable file, etc.

Figure 6:
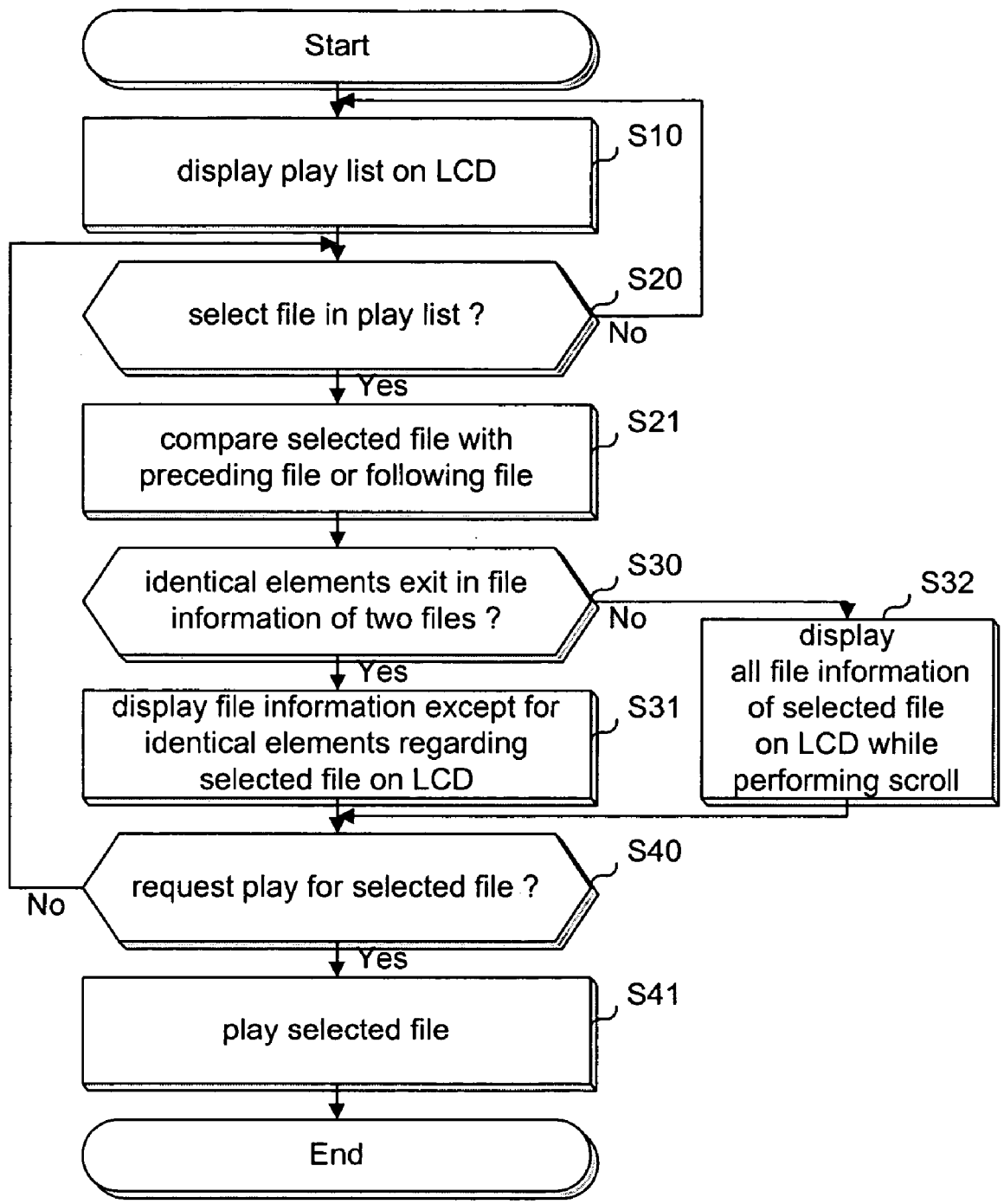
FIG. 6 is a flowchart describing a method for providing file information in a portable player according to an embodiment of the present invention.

An exemplary method for providing file information in a portable player according to an embodiment of the present invention will be described below in reference to FIG. 6, using FIG. 5. Preferably, it is assumed that the memory 10 stores MP3 audio files, some of them having the same artist name and the same album name, for example, a plurality of songs from the album "Buena Vista Social Club" by "Buena Vista Social Club".

In such a state, according to a user request or when power is applied to a device, the microcomputer 50 displays a play list on the LCD 20, in which the number of files on the play list is set according to the size of the LCD 20, for example, 5. To display the play list, the microcomputer 50 reads out the file information for audio files included in the play list from the memory 10. Since each of the audio files includes a 128-byte ID3 tag in which file information, File_Info, is stored, the microcomputer 50 reads the information stored in the tag.

The microcomputer 50 displays file information for audio files included in the play list on the LCD 20, on the basis of the read file information. Here, the microcomputer 50 can not display file information for each file included in the play list on a single screen, because the displaying area of the LCD 20 is limited in the miniaturized portable player. Therefore, the microcomputer displays file information from the audio file on the LCD, as much as the LCD can display at a time.

After that, when an audio file is selected from the play list by a user operating direction keys (for example, an up button or a down button), (step S20), the selected file, represented by a song name, for example, is highlighted. At the same time, the microcomputer 50 compares the selected file with the file preceding the selected file and/or the file following the selected file in the play list with respect to the file information (step S21), and determines whether there are identical contents (elements) in the file information of the compared files (step S30). If portions of the file information of the compared files are identical, it may be determined that the compared files belong to the same album of the same artist. In this case, elements in the file information, namely, artist name, album name, year, comments, of the compared files, may be generally identical to each other, while the song names are not identical.

As such, when the microcomputer 50 determines that some elements of the file information of the compared files are identical to each other, only the non-identical element of the file information (for example, song name) regarding the selected file (i.e., the file that is highlighted), is displayed on the LCD 20 (step S31).

On the other hand, when the microcomputer 50 determines that there is no identical element in the file information of the compared files, the microcomputer 50 displays elements of the file information using a general method. Namely, the microcomputer 50 scrolls and displays most or all of the file information, i.e., an artist name, an album name, a year, a comment, a song name, etc., regarding the selected file, in order on the LCD 20 (step S32).

Figure 7:
FIG. 7 is a screen displaying a play list according to the file information providing method according to the present invention.

FIG. 7 represents a screen displaying a play list according to the file information providing method according to the present invention, in which the first song (i.e., file) is selected and highlighted. Here, the play list includes only the songs belonging to one album "Buena Vista Club album" by "Buena Vista Social Club" (artist name), as an example.

In accordance with an exemplary method of this invention, the microcomputer 50 compares the selected song (for example, Buena Vista Social Club-Buena Vista Social Club-1997-05. Dos Gardenias.mp3) with the next song of the play list (or example, Buena Vista Social Club-Buena Vista Social Club-1997-06.Y Tu Que Has Hecho?.mp3). Both songs included in the same album of the same artist have file information which may be identical to one another except for their song names.

Based on the comparison, if portions of the file information of both songs are identical to each other, the microcomputer 50 displays, in order, the remaining elements of the selected song which are not identical, i.e., in this case, only the song name (05. Dos Gardenias), and does not immediately display the identical elements of the file information of the selected song, i.e., Buena Vista Social Club, Buena Vista Social Club, 1997, on the LCD 20. Here, the microcomputer operates to scroll the remaining elements, as occasion demands or if desired.

When the last song of the play list is selected and highlighted, the microcomputer 50 compares file information of the selected song (or file) with that of the file (or song) preceding the selected song, and, based on the comparison, performs a display operation of the file information according to the above method. On the other hand, if the selected song (or file) is not the first one and the last one in the play list, the microcomputer 50 compares the selected song (or file) with the preceding song (or file) and/or the following song (or file), and, based on the comparison, performs a display operation of the file information according to the above method.

If some elements of the file information of a preceding song are identical to those of the file information of a selected song, but some elements of the file information of a following song are not identical to those of the file information of the selected song, namely if the selected song and the preceding song belong to the same album by the same artist, but the following song does not belong to the same album of the selected song, the microcomputer 50 preferably displays only the non-identical elements regarding the selected song. However, to give an indication as to which of the preceding or following songs have common elements with the selected song, a symbol is used. For example, the microcomputer 50 may display a symbol, for example, "▲", which indicates that the currently highlighted song has file information portions that are identical to those of the preceding song, when providing file information.

On the other hand, if some elements of the file information of the following song are identical to those of the file information of the selected song, but some elements of the file information of the preceding song are not identical to those of the file information of the selected song, the microcomputer 50 displays only the non-identical elements regarding the selected song. Further, the microcomputer 50 may display a symbol, for example, "▼", which indicates that the currently selected song has file information portions of which are identical to those of the following song, when providing file information.

Regarding a song that is adjacent to a selected song, whose file information is partially identical to that of the selected and highlighted song, if file information does not scroll, then the LCD displays file information of the adjacent song as much as it can. In such cases, only portions of the file information may be displayed. For example, the display may display the artist name but does not display the album name. In order to resolve such a problem, for the song preceding or following the selected song whose file information is partially identical to that of the selected song, or for all the songs whose file information is partially identical to that of the selected song, file information of those songs can be scrolled such that a name of an artist, an album name, a year, a comment, etc., can be displayed in order.

When file information of the selected and highlighted song in the play list displayed on the current screen is partially identical to that of the song preceding and/or following the selected song, such as when the selected song belongs to the same album of the same artist, non-identical elements of the file information (including a song name) of the selected song are provided As a result, the selected song can be more rapidly identified through the provided file information (e.g., song name). Therefore, desired operations, such as a search operation and a playback operation, can be more rapidly performed.

Regarding the song selected and highlighted through operations of the direction keys such as an up button or a down button, when a user requests a playback operation for the selected song through a play or an enter key button in step S40, the microcomputer 50 performs a playback operation for the selected song, for example an MP3 audio file, for which playback was requested (step S41). For this, the microcomputer 50 reads audio data compressed and recorded in a frame from the memory 10 using information included in headers of the audio files for which playback was requested. Also, the decoder 30 restores the read compressed audio data to the original audio data for outputting the uncompressed audio data to the audio signal processor 40. The audio signal processor 40 performs a playback operation, such that the restored audio data is converted into an audio signal to be outputted, thereby reproducing high quality audio signal from the audio data.

In various exemplary embodiments, when performing a playing operation of the selected song, the microcomputer 50 may scroll all file information of the selected song, namely, artist name, album name, year, comments, song name, etc., and displays them in order on the LCD 20. In other words, the non-identical file information of the selected song can be briefly provided during a step for selecting the selected song, but all file information of the selected song may be provided in detail during a playing step.

In another exemplary embodiment, only the non-identical file information of a song being played (i.e., the selected song), in which the elements are not identical to file information of the song preceding or following the selected song being played, are briefly displayed (or additionally, displayed by a scroll operation as occasion demands, such as when the non-identical elements are larger than the LCD display size). In addition, the song immediately preceding or immediately following the song being played, and whose file information is partially identical to that of the selected song being played may have its identical file information be displayed in order while the selected song is being played.

Figure 8A:
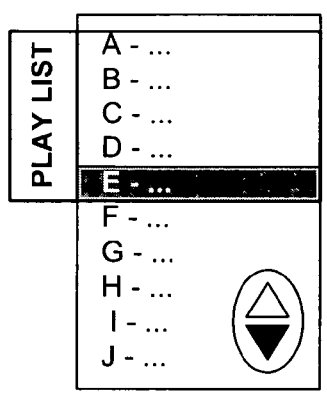
FIG. 8a to FIG. 8c are views illustrating two display modes displaying a play list in a portable player.
Figure 8B:
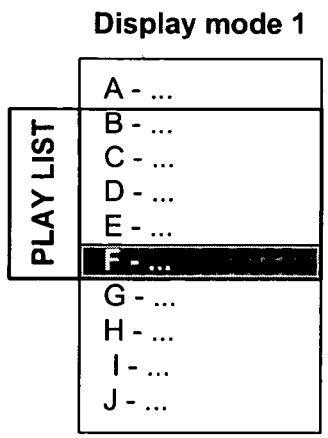
Figure 8C:
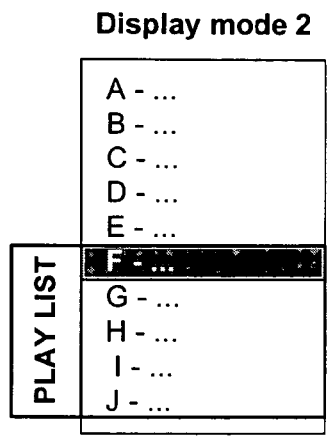

FIG. 8a illustrates a case where a down button of the direction key buttons is pressed when a last song E is selected in a play list including 5 songs, A, B, C, D, and E. FIG. 8b illustrates a case (display mode 1) of a play list that includes 5 songs of B, C, D, E, and F, which are displayed because the song F is added next to the song E, but the song A is excluded form the list. In other words, a single song is added and/or excluded from the list at a time. FIG. 8c illustrates a case (display mode 2) of a play list that includes 5 songs of F, G, H, I, and J, which are displayed because the 5 songs next to the song E are added. In other words, a plurality of songs are added and/or excluded from the list at a time.

Similarly, when an up button of the direction key buttons is pressed when a first song is selected in a play list, one mode allows a single song to be added and/or excluded from the list at a time, and another mode allows a plurality of songs to be added and/or excluded from the list at a time, both in the up direction, similar to the above descriptions of FIG. 8b and FIG. 8c.

Figure 9A:
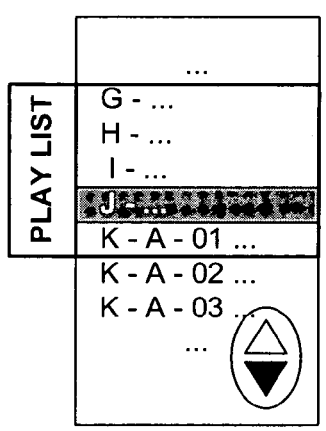
FIGS. 9 to 11 are views describing problems which may occur in display modes displaying a play list and solutions resolving the problems, according to the embodiments of the present invention.
Figure 9B:
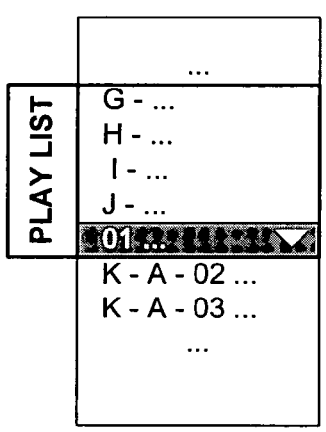

FIG. 9a shows a display state, i) where the fourth song J is selected in the play list that includes 5 songs of G, H, I, J, K-A-01, ii) where the fourth song J is not related to the fifth song K-A-01 that is in the play list, and iii) where file information of the fifth song K-A-01 is partially identical to that of the next song K-A-02 not in the play list, which means that the two songs K-A-01 and K-A-02 belong to the same album A of the same artist K. In such a display state, when a down button is pressed to select and highlight the fifth song K-A-01, only an element 01 (i.e., the non-identical element) of the fifth song K-A-01 is displayed as shown in FIG. 9b, regardless of display modes 1 and 2. In other words, the element 01 of song K-A-01 is file information that is non-identical, unlike the elements (K-A) that are identical to those of file information of the song K-A-02, which is not included in the play list and not displayed on the LCD. Unfortunately, because the identical information is not displayed, precise information for the selected song K-A-01 cannot be identified.

Figure 9C:
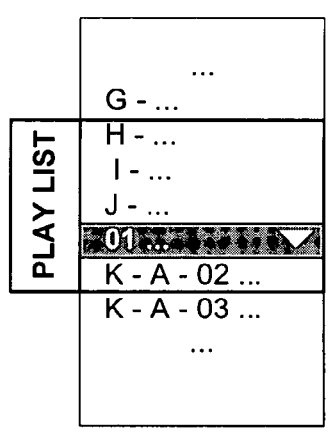

To resolve such a problem, FIG. 9c shows an exemplary solution where the play list is moved from the current position shown in FIG. 9b downward by one song such that the play list can be composed of 5 songs, H, I, J, K-A-01, and K-A-02. After that, the fourth song K-A-01 in the newly changed play list is shown as selected, namely the fourth song is displayed in a highlighted or shaded fashion. Also, the non-identical element 01 of the selected song is displayed while the identical elements K-A are not displayed, and an identification symbol, for example, "▼", is also displayed, for example, next to the highlighted or selected song, in which the identification symbol shows that file information of the fourth song is partially identical to that of the fifth song K-A-02. Therefore, in this case, the play list is moved further to ensure that another song having some identical elements to a selected or highlighted song is included into the play list so that the another song is used to display the mutually identical elements on the LCD.

Figure 10A:
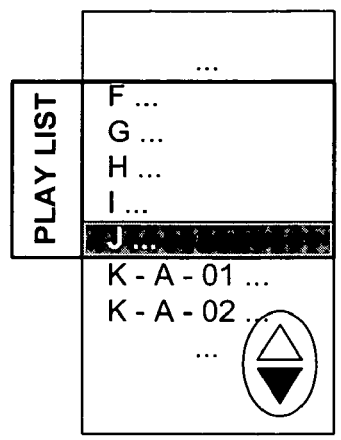

FIG. 10a shows a display state, i) where the fifth song J is selected in a play list that includes 5 songs of F, G, H, I, and J, ii) where the fifth song J in the play list is not related to the next song K-A-01 not in the play list (and not displayed), and iii) where file information of the songs not shown in the play list such as the next song K-A-01 and the others next to the song K-A-01 are partially identical to each other, which means that the non-displayed songs belong to the same album A of the same artist. In such a display state, when a down button is pressed so that the play list moves to add and highlight a song that was previously not included and not selected, that is when the song K-A-01 is selected, there is no problem in display mode 2, which allows a list to add a plurality of songs as shown in FIG. 10c.

Figure 10B:
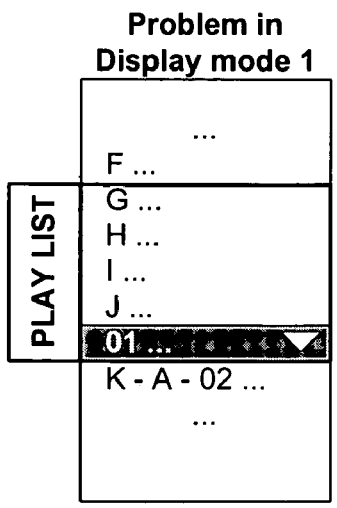
Figure 10C:
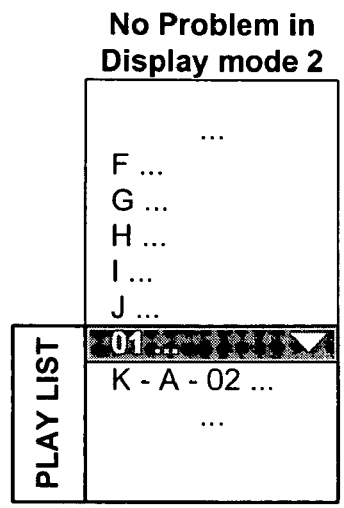

However, there is a problem in display mode 1, which allows a play list to add a single song, as shown in FIG. 10b. Namely, display mode 1 results in a play list that will include and display songs G, H, K, J, and K-A-01, in which the play list is configured such that the new song K-A-01 is added next to the previously last song J. However, then only an element 01 of the song K-A-01 that is selected and highlighted is displayed, in which the element 01 is non-identical file information, unlike elements (K-A) that are identical to those of file information of the song K-A-02, which is not included in the play list and is not displayed on the LCD. Therefore, precise information for the selected song K-A-01 cannot be identified.

Figure 10D:
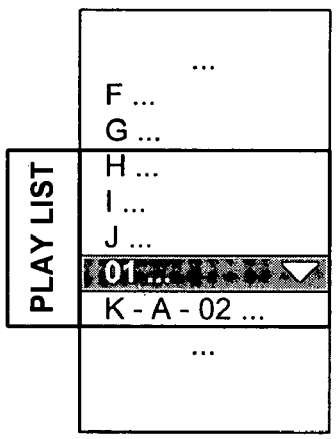

To resolve such a problem, FIG. 10d shows an exemplary solution where the play list is moved from the current position to the down side by two songs such that the play list can be composed of 5 songs, H, I, J, K-A-01, and K-A-02 so that another song having identical elements with the selected song becomes included in the play list. After that, the selected song K-A-01 is highlighted or shaded as the fourth song in the newly changed play list. Also, only the non-identical element 01, and not the identical elements K-A, is displayed, and an identification symbol, for example, "▼", is also displayed, in which the identification symbol shows that file information of the fourth song is partially identical to that of the fifth song K-A-02.

Figure 11A:
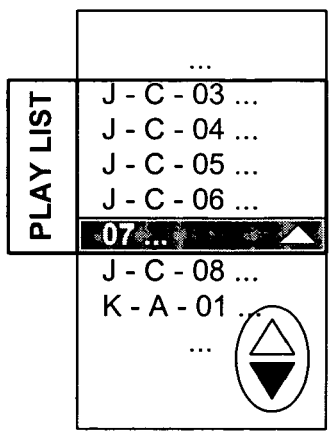

FIG. 11a shows a display state i) where the last song, namely the fifth song J-C-07 is selected in a play list including 5 songs of J-C-03, J-C-04, J-C-05, J-C-06, and J-C-07, ii) the fourth song J-C-06 of the play list, the fifth song J-C-07 of the play list, and the next song J-C-08 not of the play list are partially identical to each other in terms of file information, which means that the three songs belong to the same album C of the same artist J), and iii) where the song J-C-08 not of the play list is not related to the another next song K-A-01 not of the play list. In such a display state, when a down button is pressed, that is when the song J-C-08 is selected, there is no problem in display mode 1, which allows a single song to be added to the list as shown in FIG. 11b.

However, there is a problem in display mode 2, which allows a plurality of songs to be added to the list, as shown in FIG. 10c. Namely, a new play list of 5 songs is displayed that includes the song J-C-08 that was selected, as well as others after the selected song J-C-08. Only an element 08 of the song J-C-08, which is selected and displayed in a highlight fashion, is displayed. In this case, the element 08 is non-identical file information, not the elements J-C that are identical to those file information of the song J-C-07, which is not included in the new play list and not displayed on the LCD. Therefore, precise information for the selected song cannot be identified.

Figure 11B:
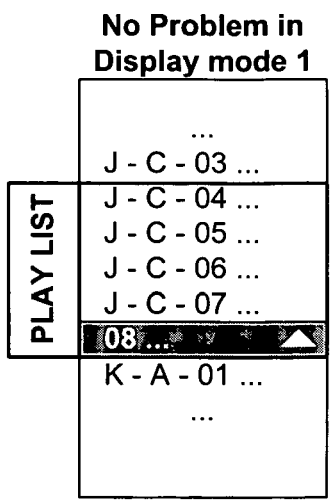
Figure 11C:
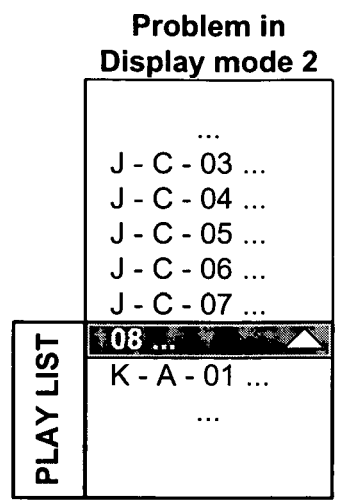
Figure 11D:
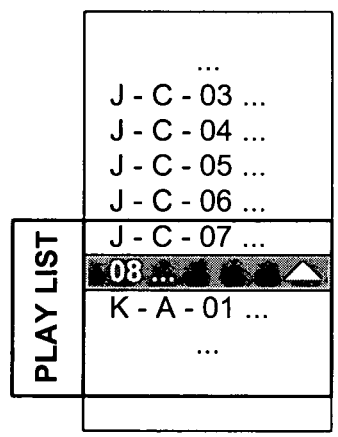

To resolve such a problem, one solution is to actually ignore processing the play list in display mode 2, and instead the play list may be processed in a similar fashion to the method for processing display mode 1, as shown in FIG. 11b. That is, instead of adding a plurality of songs to the list, only a single song is added. Another solution, as shown in FIG. 11d, is to display a new play list that includes a song J-C-07 as the first song in the new play list, in which the song J-C-07 is prior to the newly selected song J-C-08, instead of the play list including the newly selected song J-C-08 as the first song.

In other words, the play list is scrolled down from the current position as shown in FIG. 11a by adding less than the full plurality of songs to the list, for example, only 4 songs instead of 5 songs. After that, the selected second song J-C-08 in the newly changed play list is displayed in a highlighted or shaded fashion. Also, only the non-identical element 08, and not the identical elements J-C, is displayed, and an identification symbol, for example, "▲", is also displayed, in which the identification symbol shows that file information of the selected second song J-C-08 is partially identical to that of the non-selected first song J-C-07.

When an up button of the direction key buttons is pressed in a state where the first song in the play list is selected, similar problems as those found in FIGS. 10 and 11 occur. The solutions to such display problems are similar to the operations as the above descriptions for FIGS. 10 and 11 for the case when the down button is pressed.

As described above, the method for providing file information in a portable player according to the present invention enables easy identification and location of music files in the portable player, many having limited display size, and enables rapid playback of a desired file. Further, the present invention is readily applicable to any electronic device with limited display area including but not limited to handheld devices and mobile terminals.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for providing file information in a portable player, comprising:
    (a) displaying a list of files on a screen of the portable player;
    (b) comparing a selected file with at least one of a file preceding the selected file or a file following the selected file in the list, wherein said comparing includes comparing predetermined types of file information, and wherein at least one type of file information of the selected file and the preceding or following file is identical and at least one type of file information is not identical;
    (c) displaying in a same screen the non-identical file information and not displaying the identical file information at a position in the list which corresponds to the selected file on the screen based on the comparison of the selected file to the at least one of the preceding file or the following file; and
    (d) displaying in the same screen at least the identical file information at a position in the list which corresponds to the preceding file or the following file, wherein:
    the files are stored in the portable player before said comparing is performed,
    the non-identical file information is on a different hierarchical information level than the identical file information, said method further comprising:
    displaying a first plurality of files before the comparing in (b), the first plurality of files including a first file that corresponds to the selected file and a second file having all different file information from the first file, the first file displayed with the identical file information and the non-identical file information, the first file further being displayed in unselected form in the first plurality of files and wherein the following or preceding file is not displayed with the first plurality of files, and
    displaying, after the comparing in (b), a second plurality of files that includes the first file in selected form and either the preceding file having the identical file information or the following file having the identical file information, the second plurality of files automatically displayed when an icon or key is activated while the first plurality of files is displayed,
    wherein the selected first file is displayed in the second plurality of files with the non-identical information and not the identical information, and wherein the preceding file or following file is displayed in the second plurality of files with at least the identical file information.

2. The method as set forth in claim 1, wherein the files include at least one of an MPEG-1 Audio Layer 3 (MP3) audio file, a Windows Media Audio (WMA) audio file, an Ogg audio file, or a musepack (MPC) audio file.

3. The method as set forth in claim 2, wherein if the files are MP3 audio files, the predetermined types of file information are read from an identification tag of the files to be compared.

4. The method as set forth in claim 1, wherein the identical file information is at least one of an artist name or an album title and wherein the non-identical file information is a song title, the at least one artist name or album title displayed in the same screen as the song title.

5. The method as set forth in claim 1, wherein the non-identical file information of the selected file is displayed in a highlighted or shaded fashion.

6. The method as set forth in claim 1, further comprising:
    providing a symbol with the selected file,
    wherein the symbol indicates which of the preceding file or the following file has at least one type of the file information identical with respect to the file information of the selected file.

7. The method as set forth in claim 6, further comprising:
    displaying the identical file information at the position in the list which corresponds to the preceding file or the following file information in a scroll fashion.

8. The method as set forth in claim 6, wherein the symbol does not scroll.

9. The method as set forth in claim 6, wherein a third file in the list is displayed on a different screen and is highlighted, a fourth file is displayed in the list on the screen, and a fifth file is not displayed in the list on the screen but is stored in the portable player, and
    wherein the third and fourth files are not identical to each other with respect to the predetermined types of the file information, while the fourth and fifth files are identical to each other with respect to at least one or more of the predetermined types of the file information, said method further comprising:
    upon selection of the fourth file, displaying the third, fourth and fifth files on the screen;
    highlighting the fourth file to indicate selection;
    providing to the different screen, at least one type of the file information of the second file which is not identical to the file information of the fifth file; and
    providing to the screen, at least one type of the file information of the fifth file which is identical to the file information of the fifth file.

10. The method as set forth in claim 1, wherein the non-identical file information is displayed in a scroll fashion, if the non-identical file information is larger than a size of the screen.

11. The method as set forth in claim 1, further comprising: providing all types of the file information of the selected file in a scroll fashion, if the selected file is played.

12. The method as set forth in claim 1, wherein the preceding or following files immediately precede or immediately follow the selected one file.

13. The method as set forth in claim 1, wherein the selected first file is displayed in the second plurality of files in a position different from a first or last position in the list.

14. The method as set forth in claim 1, wherein a symbol is displayed with the selected first file in the second plurality of files, the symbol providing an indication that one or more additional files not displayed in the second plurality of files are stored for display and include at least the identical information.

15. A device comprising:
a screen;
a memory to store a plurality of files; and
a controller to control display of information on the screen corresponding to one or more of the plurality of files, wherein the controller controls:
(a) display a list of files on the screen;
(b) compares a selected file with at least one of a file preceding the selected file or a file following the selected file in the list, wherein the comparison includes comparing predetermined types of file information and wherein at least one type of file information of the selected file and the preceding or following file is identical and at least one type of file information is not identical;
(c) displays in a same screen the non-identical file information and not displaying the identical file information at a position in the list which corresponds to the selected file on the screen based on the comparison of the selected file to the at least one of the preceding file or the following file; and
(d) displays in the same screen at least the identical file information at a position in the list which corresponds to the preceding file or the following file, wherein:
the files are stored in the memory before the comparison is performed,
the non-identical file information is on a different hierarchical information level than the identical file information, wherein the controller further controls:
before the comparison in (b), display of a first plurality of files including a first file that corresponds to the selected file and a second file having all different file information from the first file, the first file displayed with the identical file information and the non-identical file information, the first file further being displayed in unselected form in the first plurality of files and wherein the following or preceding file is not displayed with the first plurality of files, and
after the comparing in (b), display of a second plurality of files that includes the first file in selected form and either the preceding file having the identical file information or the following file having the identical file information, the second plurality of files automatically displayed when an icon or key is activated while the first plurality of files is displayed,
wherein the selected first file is displayed in the second plurality of files with the non-identical information and not the identical information, and wherein the preceding file or following file is displayed in the second plurality of files with at least the identical file information.

* * * * *